United States Patent [19]

Johnson

[11] Patent Number: 5,161,867

[45] Date of Patent: * Nov. 10, 1992

[54] DRIVE WHEEL ASSEMBLY

[75] Inventor: Clifton E. Johnson, Red Lake Falls, Minn.

[73] Assignee: Power Equipment Corporation, Osseo, Minn.

[*] Notice: The portion of the term of this patent subsequent to Jul. 21, 2009 has been disclaimed.

[21] Appl. No.: 647,309

[22] Filed: Jan. 28, 1991

[51] Int. Cl.⁵ .............................................. B62D 55/12
[52] U.S. Cl. ................................. 305/57; 305/35 EB; 305/39; 305/56
[58] Field of Search ............ 305/21, 24, 35 R, 35 EB, 305/38, 39, 56, 57

[56] References Cited

U.S. PATENT DOCUMENTS

| | | | |
|---|---|---|---|
| 1,804,470 | 5/1931 | Knox | 305/56 X |
| 2,376,802 | 5/1945 | Morse | 305/56 X |
| 2,537,745 | 1/1951 | Daniels | 305/38 X |
| 4,861,120 | 8/1989 | Edwards et al. | 305/39 X |
| 4,884,852 | 12/1989 | Edwards et al. | 305/39 X |

Primary Examiner—Russell D. Stormer
Attorney, Agent, or Firm—Jerold M. Forsberg

[57] ABSTRACT

A drive wheel assembly includes a rim for supporting a resilient tire made of a material a high coefficient of friction and a high degree of elasticity. The assembly includes a sprocket attached to the rim and cooperating with the resilient tire to limit the penetration of the sprocket teeth. The assembly is designed for frictional driving surfaces of the drive wheel assembly to transmit substantially all of the driving force to an endless belt under normal conditions and for the sprocket teeth engaged in openings in the endless belt to prevent slippage of the drive wheel assembly relative to the endless belt under exceptional conditions.

15 Claims, 3 Drawing Sheets

DRIVE WHEEL ASSEMBLY

BACKGROUND OF THE INVENTION

This application is copending with my other applications entitled "Drive System for a Track Type Vehicle" and "Idler Wheel Assembly".

The present invention relates generally to a drive wheel assembly, and more specifically to a drive wheel which includes at least one portion constructed of a material having a high coefficient of friction and a high degree of elasticity and another portion that has a sprocket of a fixed configuration.

Efforts are continually being made to improve the drive mechanisms for endless belts. A very positive form of driving an endless belt is by a sprocket engaging a series of openings equally spaced along the belt. The problem with such an arrangement includes excessive wear of the endless belt in the area of the openings. In order to overcome this problem endless belts have been developed with transversely extending reinforcement means which is embedded in the endless belt at the time it is constructed. This arrangement has the problem of heavy wear occurring at the sprocket when the endless belt is heavily loaded. This is in addition to wear occurring at the transversely extending reinforcements. One answer to this problem has been to limit the amount of penetration of the sprocket teeth into the openings. Again, there can be substantial wear of the sprocket teeth and of the reinforcing elements when the endless belt is heavily loaded and particularly if the arrangement is being used in an environment where abrasive contaminants may be introduced.

Power driven endless belts have been known for some time. However, none of the known systems teach a drive wheel assembly as taught by the instant invention. One prior art system, depicted in U.S. Pat. No. 3,120,409, shows an endless belt with V-belt type construction used in conjunction with integrally formed sprockets with V-grooves. The V-grooves of pulley 40 provide the primary driving forces and the sprocket teeth, with their engagement in openings in the belt providing the secondary, or backup, driving connection. Another endless belt assembly, depicted in U.S. Pat. No. 3,870,379, shows a flexible endless belt driven by a drive sprocket having teeth engaging in openings in the belt with a guide wheel disposed adjacent to the drive sprocket to prevent the flexible belt from engaging the sprocket teeth all the way down to the root. Another wheel and track assembly for a crawler type vehicle, depicted in U.S. Pat. No. 4,241,956, shows a drive wheel assembly having a sprocket 22 and includes cylindrical surfaces 88 for each cylinder 84 and 86 which is defined by an elastomeric sleeve 90. Yet another drive system, depicted in U.S Pat. No. 4,453,611, shows a drive wheel assembly 31 which includes a drive sprocket 48 located between rims 46 and 47. A drive system, depicted in U.S. Pat. No. 3,738,714, shows a pair of drive sprocket wheels 90 used in conjunction with bearing wheels 92. Finally, there is a drive sprocket wheel, depicted in U.S. Pat. No. 3,597,018, which includes an outer ring of one material for engaging an endless belt and an inner ring of natural or synthetic elastomeric resin for absorbing shocks that the endless belt may encounter. These examples of prior art drive wheel assemblies illustrate the fact that there is a need for a drive wheel assembly as taught by the instant invention.

SUMMARY OF THE INVENTION

According to the present invention a drive wheel assembly includes a rigid rim having a sprocket centrally disposed thereon with the teeth extending radially outwardly. A resilient tire means is received on the rim means and secured thereto. The resilient tire means presents frictional driving surfaces on either side of the sprocket such that these surfaces provide the primary driving force for driving an endless belt while the sprocket teeth prevent slippage of the drive wheel assembly relative to the endless belt under exceptional conditions.

Accordingly, it is an object of the present invention to provide a drive wheel assembly which includes a primary frictional drive with a secondary positive drive.

It is another object of the invention to provide a drive wheel assembly which is capable of absorbing shock encountered by the endless belt to thereby limit the amount of shock transferred to the power source.

It is also an object of this invention to provide a drive wheel assembly which overcomes the problems found in the prior art and which is efficient and economical.

Other objects and advantages of the present invention will be apparent and understood from the following detailed description when taken into conjunction with the accompanying drawings.

DETAILED DESCRIPTION OF THE PREFERRED EMBODIMENT

Figure 1:
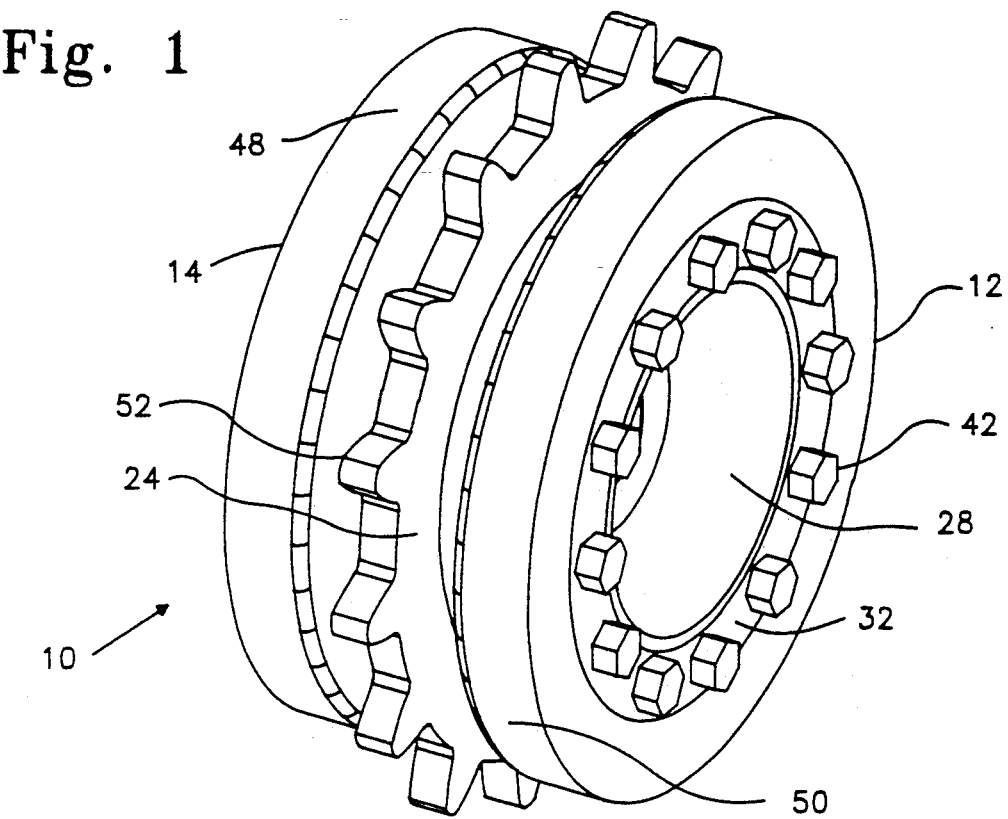
FIG. 1 is a perspective view of a drive wheel assembly according to the instant invention.

Reference herein below is made to the drawings wherein like reference numerals have been employed to designate the same or similar components throughout the various views.

Drive wheel assembly 10, as best seen in FIG. 1, includes an outer resilient frictional driving tire 12 and an inner resilient frictional driving tire 14 mounted to a rim 16 on either side of a sprocket 18.

Figure 2:
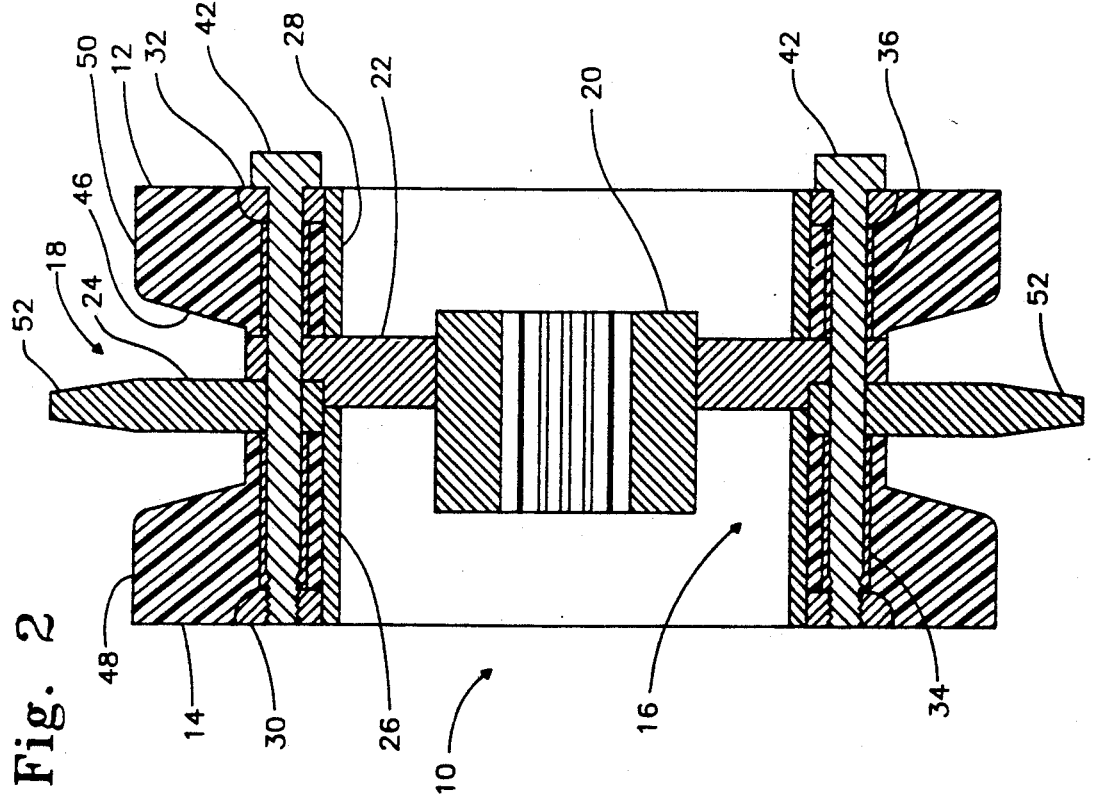
FIG. 2 is a cross-sectional view of the drive wheel assembly depicted in FIG. 1.

Referring now to FIG. 2, the rim 16 includes a splined hub 20 for attachment to a power source (not shown). A sprocket mounting disk 22 is fixedly secured to the splined hub 20 by, for example, welding, and includes a notch at the outer peripheral edge thereof in which a sprocket ring 24 is secured. Inner cylinder 26 and outer cylinder 28 are mounted on opposite sides of the sprocket mounting disk 22. Both are attached by suitable means such as welding. Resilient tires 12 and 14 have an inside diameter which is generally the same as the outside diameter of cylinders 26 and 28. Outer resilient tire 14 is mounted on outer cylinder 28 and inner resilient tire 12 is mounted on inner cylinder 26. In order to maintain the resilient tires 12 and 14 relative to the rim 16 an inner clamping plate 30 and an outer clamping plate 32 are used. Resilient tires 12 and 14 have bores 34 and 36, respectively, for receiving spacers 38 and 40, respectively. Bolts 42 pass through bores in the outer clamping plate 32, through outer spacers 40, through bores through the sprocket mounting disk 22, through bores through the sprocket ring 24, through inner spacer 38, and are then threadedly engaged in threaded bores in the inner clamping plate 30. It will be appreciated that the bolts can be tightened sufficiently to secure the assembled drive wheel assembly together without compressing the material of the resilient tires thereby causing the tires to lose their resiliency.

Figure 3:
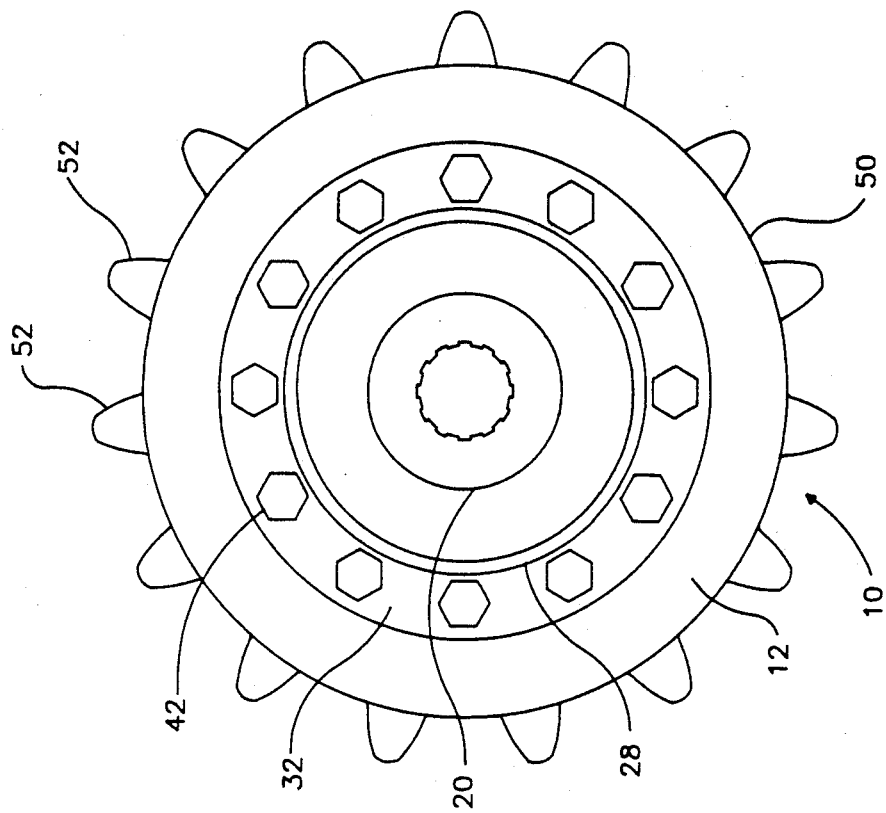
FIG. 3 is a view of the outer side of the drive wheel assembly.

Each of the resilient tires 12 and 14 forms a groove on each respective side of the sprocket ring 24 with a side wall 44 and 46, respectively, facing the sprocket ring. Walls 44 and 46 diverge outwardly at 15 degrees relative to a central axis of the sprocket ring, the significance of which will be shown later. Inner resilient tire 12 and outer resilient tire 14 each have frictional driving surfaces 48 and 50 respectively which extend substantially perpendicular to the radially extending sprocket teeth 52. Preferably, the frictional driving surfaces are generally flat and, as best seen in FIG. 3, the resilient tires have an overall diameter which is larger than the root diameter of the sprocket such that penetration to the root of the sprocket teeth is generally precluded.

Figure 5:
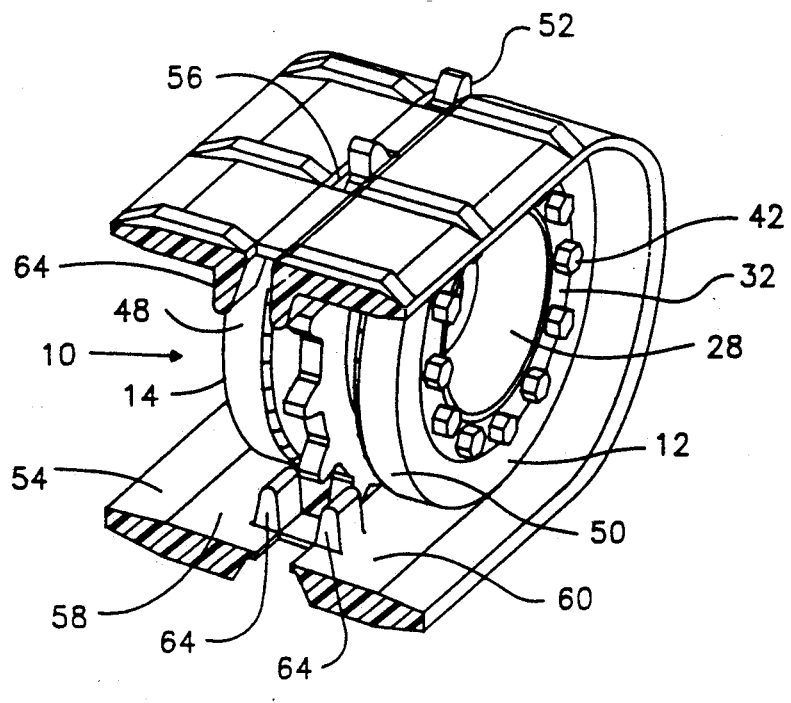
FIG. 5 is a perspective view showing the drive wheel assembly relative to a portion of an endless belt.
Figure 4:
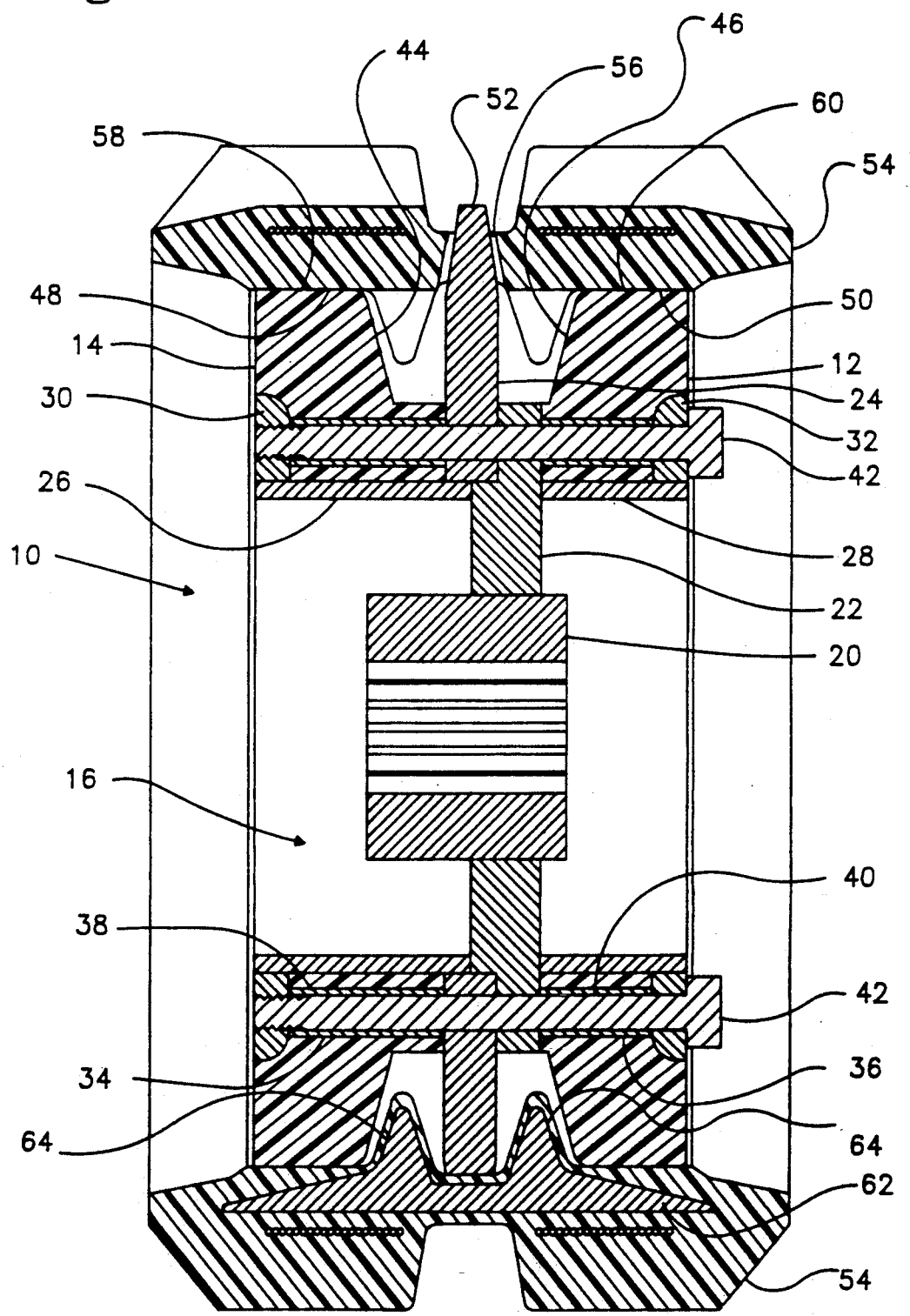
FIG. 4 is a cross-sectional view of the drive wheel assembly shown relative to an endless belt.

Referring now to FIGS. 4 and 5, drive wheel assembly 10 is shown relative to an endless belt 54 which has serially spaced openings 56 and traction surfaces 58 and 60. Traction surfaces 58 and 60 are positioned on opposite lateral sides of the serially spaced openings 56 and reinforcing elements 62 are embedded in the endless belt between adjacent openings. Elements 62 include protrusions 64 which are aligned longitudinally of the endless belt 54 on either side of the openings 56. Protrusions 64 have sides inclined at about 15 degrees relative to the traction surfaces 58 and 60. These inclined surfaces cooperate with the inclined walls 44 and 46 to maintain the alignment of the endless belt with the drive wheel assembly.

Endless belt 54 is preferably made of a rubber compound which resists abrasion and which provides for positive frictional engagement with the driving surfaces of the drive wheel assembly. Resilient tires 12 and 14 are preferably made of urethane and comprise about half of the total diameter of the assembled drive wheel assembly. The resilient tires when made of urethane have a positive frictional engagement with the endless track when the endless track is tensioned around the drive wheel assembly 10. Each situation may be different, but it has been found that at least 2,700 pounds of tension in the endless belt results in a positive frictional engagement between the driving surfaces 48 and 50 and the traction surfaces 58 and 60. Normally, the frictional engagement of the driving wheels with the endless track provides substantially all of the driving force transmitted from the drive wheel assembly 10 to the endless belt 54 and the engagement of sprocket teeth 52 in openings 56 prevent slippage of the endless belt relative to the drive wheel assembly under exceptional conditions.

While this invention has been described with a certain degree with particularity, it is manifest that many changes may be made in the details of construction and in the arrangement of components without departing from the spirit and scope of the disclosure. It is understood that the invention is not limited to the embodiments set forth herein for purposes of exemplification, but it is limited only by the scope of the attached claims, including the full range of equivalency to which each element thereof is entitled.

What is claimed is:

1. A drive wheel assembly for imparting driving forces to an endless belt comprising: rim means, sprocket means; and resilient tire means; said rim means including hub means for attachment to a power source, cylindrical means for supporting at least one resilient tire means mounted thereon, and means for attachment of said tire means to said rim means; said sprocket means being constructed of rigid material, fixedly secured to said rim means and including radially extending circumferentially spaced teeth; said resilient tire means being constructed of solid material and including at least one radially outwardly facing frictional driving surface spaced from said sprocket means by guide means, wherein said resilient tire means cushions shocks thereby limiting the amount of shock transmitted to said power source and said radially outwardly facing frictional driving surface normally imparts substantially all of the driving force to said endless belt and said sprocket teeth prevent slippage of the driving surface relative to said endless belt under exceptional conditions.

2. A drive wheel assembly as set forth in claim 1 wherein said frictional driving surface extends substantially perpendicular to the radially extending sprocket.

3. A drive wheel assembly as set forth in claim 1 wherein said resilient tire means includes a resilient tire means having a radially outwardly facing frictional driving surface disposed on each side of and spaced from opposite sides of said sprocket means by said guide means.

4. A drive wheel assembly as set forth in claim 3 wherein said frictional driving surfaces extend substantially perpendicular to the radially extending sprocket.

5. A drive wheel assembly as set forth in claim 4 wherein said guide means includes a guide groove disposed on each side of said sprocket means between said sprocket means and a respective frictional driving surface.

6. A drive wheel assembly as set forth in claim 5 wherein said means for attachment of said resilient tire means to said rim means includes a plurality of bolts extending through bores in said resilient tire means, said resilient tire means having spacer sleeves received in said bores with a respective bolt received through a respective spacer sleeve, the spacer sleeves preventing compression of the material of which the resilient tire means is made thereby preventing any changes in the inherent capabilities of the material.

7. A drive wheel assembly as set forth in claim 6 including an inner clamping plate and an outer clamping plate, said plurality of bolts extending through said outer clamping plate and fixedly securing the tire means relative to the rim means by threaded engagement with threaded bores in the inner clamping plates.

8. A drive wheel assembly as set forth in claim 7 wherein said hub means has a splined bore for attachment of the drive wheel assembly to a power source.

9. A drive wheel assembly as set forth in claim 7 wherein said rim means includes a sprocket mounting disk fixedly secured to said hub means and the sprocket means is attached to the sprocket mounting disk.

10. A drive wheel assembly as set forth in claim 9 wherein said cylinder means includes inner and outer cylinders attached to opposite sides of said sprocket mounting disk.

11. A drive wheel assembly as set forth in claim 4 wherein said sprocket teeth extend radially outwardly beyond said frictional driving surfaces.

12. A drive wheel assembly for an endless belt means comprising: rim means; radially extending rigid sprocket means having circumferentially spaced teeth; and resilient tire means with at least one radially outwardly facing frictional driving surface; said endless belt means including a series of space openings with transverse reinforcing means disposed between adjacent openings and at least one traction surface on an inside thereof; said resilient tire means being constructed of solid material having a high coefficient of friction wherein when said endless belt means is tensioned around said drive wheel assembly and said frictional driving surface is in engagement with said at least one traction surface and spaced teeth of said sprocket means are extending into aligned openings of said series of spaced openings said resilient tire means cooperates with said at least one traction surface to thereby absorb shocks received by said endless belt means and frictionally drive said endless belt means; whereby said frictional driving surface of the driving wheel assembly imparts substantially all of the driving force to the endless belt means and spaced teeth of said sprocket means engaged in spaced openings of said series of spaced openings prevent slippage of the endless belt means relative to the drive wheel assembly under exceptional conditions.

13. A drive wheel assembly as set forth in claim 12 wherein said resilient tire means includes a resilient tire disposed on each side of said sprocket means and said endless belt means includes two traction surfaces on an inside thereof for engagement by said frictional driving surfaces of each said resilient tire.

14. A drive wheel assembly as set forth in claim 13 wherein said frictional driving surfaces extend substantially perpendicular to and are spaced from opposite sides of the radially extending sprocket means.

15. A drive wheel assembly as set forth in claim 14 wherein a guide means includes a guide groove disposed on each side of said sprocket means between said sprocket means and a respective frictional driving surface and said endless belt means includes protrusions cooperating with said guide grooves to limit lateral shifting of said endless belt means relative to the drive wheel assembly.

* * * * *